United States Patent [19]

Koster et al.

[11] Patent Number: 5,450,262
[45] Date of Patent: Sep. 12, 1995

[54] MAGNETIC-TAPE APPARATUS WITH PIVOTABLY MOUNTED MAGNETIC HEAD

[75] Inventors: Marinus P. Koster; Albert Visscher; Robert C. H. Boereboom; Casparus W. Kruijer; Jaap Oudes, all of Eindhoven, Netherlands

[73] Assignee: U.S. Philips Corporation, New York, N.Y.

[21] Appl. No.: 213,482

[22] Filed: Mar. 14, 1994

[30] Foreign Application Priority Data

Mar. 15, 1993 [EP] European Pat. Off. ............ 93200745

[51] Int. Cl.⁶ .............................................. G11B 5/48
[52] U.S. Cl. .................................................. 360/104
[58] Field of Search ...................... 360/104, 109, 2, 3

[56] References Cited

U.S. PATENT DOCUMENTS 3,882,543  5/1975  Richards ............................ 360/109
4,485,420  11/1984  Schoenmakers ............... 360/130.21

FOREIGN PATENT DOCUMENTS 0063398  10/1982  European Pat. Off. .
0120518  10/1984  European Pat. Off. .

Primary Examiner—A. J. Heinz
Attorney, Agent, or Firm—Brian J. Wieghaus

[57] ABSTRACT

A magnetic-tape apparatus has a magnetic-head unit with a magnetic head having a head face for guiding a magnetic tape. The magnetic head has transducing gaps for writing and/or reading information onto/from the magnetic tape. The magnetic-head unit further comprises two height limiters having tape-guide surfaces for guiding an edge of the magnetic tape. A tangent line, which is tangent to both tape-guide surfaces, extends perpendicularly to an imaginary line in the head face and passing through the transducing gaps. If an edge of the magnetic tape is in contact with the two height limiters, the position of the magnetic tape relative to the magnetic head is always the same, so that no azimuth errors can arise. In order to bring this edge of the magnetic tape into contact with the height limiters, the magnetic-head unit is mounted so as to be pivotable about an axis perpendicular to a tangent plane to the head face at the location of the transducing gaps. This axis extends through the center of gravity of the magnetic-head unit.

19 Claims, 3 Drawing Sheets

MAGNETIC-TAPE APPARATUS WITH PIVOTABLY MOUNTED MAGNETIC HEAD

BACKGROUND OF THE INVENTION

This invention relates to a magnetic-tape apparatus comprising a magnetic-head unit including a magnetic head having a head face and at least one transducing gap, which extends in the head face, for writing and/or reading information onto/from a magnetic tape. The magnetic-head unit further comprises two height limiters each having a tape-guide surface for guiding an edge of the magnetic tape, a tangent line, which is tangent to both tape-guide surfaces, extending perpendicularly to an imaginary line in the head face parallel to the transducing gap. The imaginary line and the tangent line, which are perpendicular to one another, may intersect one another or cross one another. Such a construction of the magnetic-head unit ensures that in operation the longitudinal axis of the magnetic tape extends perpendicularly to the transducing gap, so that the magnetic tape always occupies the same position relative to the transducing gap during writing and reading of information on the magnetic tape and no azimuth error can occur.

The invention further relates to a magnetic-head unit suitable for use in the magnetic-tape apparatus, which unit comprises a magnetic head having a head face and a transducing gap adjacent the head face, and two height guides, which each have a tape-guide surface.

A magnetic-tape apparatus and a magnetic-head unit of the types defined above are known from U.S. Pat. No. 4,485,420 (herewith incorporated by reference). In order to ensure that an edge of a magnetic tape remains in contact with height limiters control elements arranged opposite said height limiters press against the other edge of the magnetic tape. In the known magnetic-tape apparatus these control elements are formed by resilient means. A magnetic-head unit of the known apparatus is fixedly mounted in the magnetic-tape apparatus and is provided with a magnetic head. The magnetic head has two transducing gaps for reading and writing a left-channel and right-channel stereo/audio signal. If, in operation, the longitudinal axis of the magnetic tape is not oriented perpendicularly to the transducing gap the height limiters in conjunction with the resilient means, will correct the position of the magnetic tape at the location of the magnetic-head unit. The magnetic tape is then urged into the correct position. This gives rise to stresses in the magnetic tape, as a result of which the magnetic tape is not pressed against the head face with the same force over its entire width and may even come off the head face near one of the edges. In analog audio recording in accordance with the generally known standard Compact Cassette system this does not lead to any significant problems because the transducing gaps extend across a substantial part of the width of the magnetic tape and the signals have a large wavelength, so that during recording a small clearance between the magnetic head and the magnetic tape may exist without immediately giving rise to any appreciable signal loss.

In digital audio recording in accordance with the generally known standard Digital Compact Cassette system the magnetic head of the magnetic-tape apparatus has a comparatively large number of transducing gaps and the wavelength of the audio signals is substantially smaller than with analog audio recording. Should the magnetic tape come off the head face near one of the edges of the magnetic tape this would result in one or more transducing gaps being no longer in contact with the magnetic tape, leading to signal loss.

SUMMARY OF THE INVENTION

It is one of the objects of the invention to provide a magnetic-tape apparatus of the type defined in the opening sentence, having an improved contact between the magnetic tape and the magnetic head in comparison with the known magnetic-tape apparatus. To this end the magnetic-tape apparatus in accordance with the invention is characterized in that the magnetic-head unit is pivotably mounted in the magnetic-tape apparatus and under the influence of the magnetic tape is pivotable about a pivotal axis perpendicular to a tangent plane to the head face near the transducing gap. If now the longitudinal axis of the magnetic tape is not perpendicular to the transducing gap the control elements will again press an edge of the magnetic tape against the height limiters but instead the magnetic tape being urged into the correct position the magnetic-head unit will be pivoted to align itself relative to the magnetic tape. The magnetic tape is then hardly or not deformed, so that the magnetic tape is pressed against the head face with substantially the same force over its entire width.

An embodiment of the magnetic-tape apparatus in accordance with the invention is characterized in that the pivotal axis extends through the centre of gravity of the magnetic-head unit. Thus, the magnetic-head unit will not subject the magnetic tape to any forces resulting from the pivotable arrangement and leading to deformation, so that an optimum contact can be obtained between the magnetic tape and the magnetic head.

An embodiment of the magnetic-tape apparatus in accordance with the invention is characterized by the presence of a capstan and a pressure roller, the pressure roller having an at least substantially conical shape. Thus, the magnetic-tape apparatus has means for pressing the magnetic tape against the height limiters, thereby ensuring a correct positioning of the magnetic tape relative to the magnetic head. Since the magnetic-tape apparatus generally comprises a capstan and a pressure roller for the tape transport, the means for pressing the magnetic tape against the height limiters require hardly any additional adaptations of the magnetic-tape apparatus. The pressure which presses the magnetic tape against the height limiters is now produced as follows. In operation the pressure roller presses the magnetic tape against the capstan for the tape transport. Owing to the conical shape of the pressure roller the pressure roller exerts a moment on the magnetic tape, which at the location of the magnetic-head unit results in the magnetic tape being subjected to forces which press the magnetic tape with an edge against the height limiters. For this purpose the shape of the pressure roller need not be exactly conical but should be such that the magnetic tape is subjected to a moment resulting in a force which presses the magnetic tape against the height limiters.

The magnetic-head unit in accordance with the invention is characterized in that the magnetic-head unit comprises pivoting means with a pivotal axis which extends perpendicularly to a tangent plane to the head face near the transducing gap. The pivotal axis preferably extends through the mass centre of the magnetic-head unit.

These and other aspects of the invention will be apparent from and illustrated by means of the embodiments described hereinafter.

BRIEF DESCRIPTION OF THE DRAWINGS

The invention will now be described in more detail, by way of example, with reference to the drawings. In the drawings.

DESCRIPTION OF THE PREFERRED EMBODIMENTS

Figure 1:
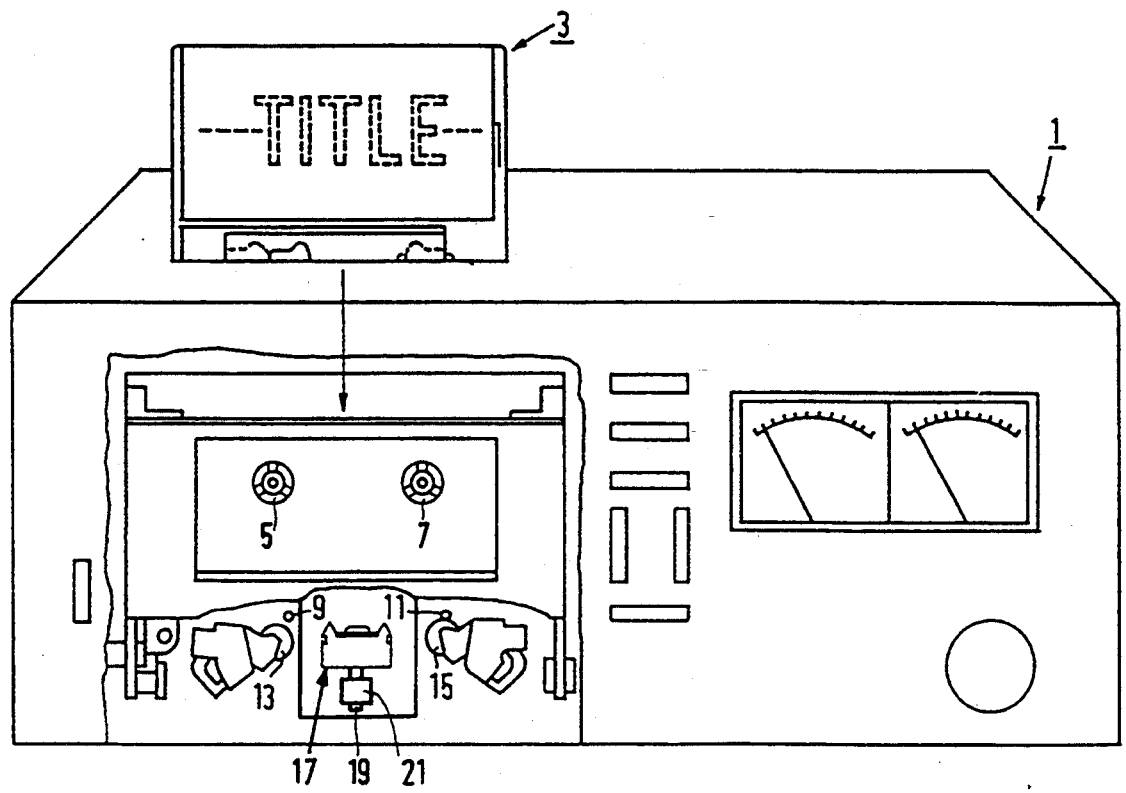
FIG. 1 shows a magnetic-tape apparatus in accordance with the invention.

FIG. 1 shows a magnetic-tape apparatus 1 in accordance with the invention, which apparatus is adapted to cooperate with a magnetic-tape cassette 3. The magnetic-tape apparatus 1 has two reel-drive spindles 5, 7 for the take-up and supply of magnetic tape on reels, two capstans 9, 11 cooperating with two pressure rollers 13, 15 for the transport of magnetic tape in a longitudinal direction, and a magnetic-head unit 17 for reading and/or writing information from/onto magnetic tape. The magnetic-head unit 17 is connected to a spindle 19, which is rotatable in a beating 21.

Figure 2:
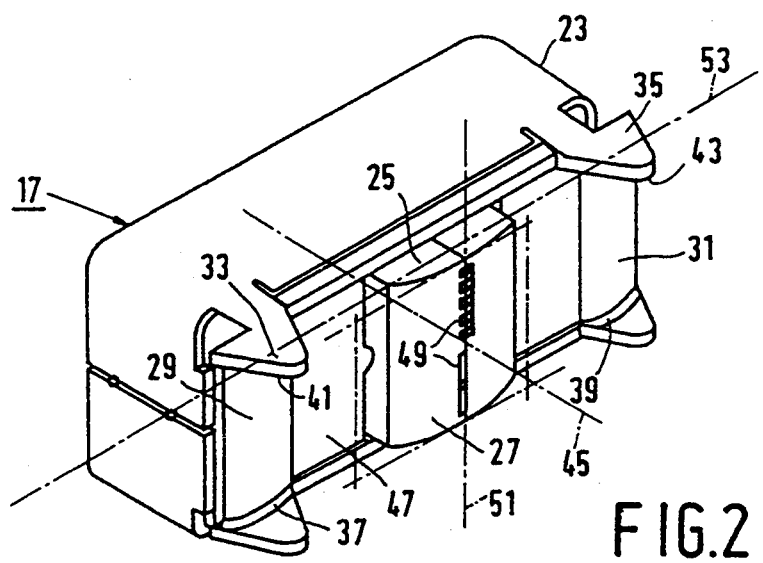
FIG. 2 shows a magnetic-head unit in accordance with the invention and applied into the magnetic-tape apparatus shown in FIG. 1.

FIG. 2 shows the magnetic-head unit 17. The magnetic-head unit 17 has a housing 23, which accommodates a magnetic head 25 having a head face 27. The housing 23 carries two tape guides 29, 31 having at their ends two height limiters 33, 35 and two tape-pressure walls 37, 39, which are inclined relative to the tape guides 29, 31 and which form control elements for pressing the magnetic tape against the height limiters 33, 35. The height limiters 33, 35 have tape-guide surfaces 41, 43 for guiding an edge of the magnetic tape in operation. The magnetic-head unit 17 is pivotable about a pivotal axis 45 which is perpendicular to a plane 47 tangent to the head face 27 at the location of transducing gaps 49 in the head face 27. The magnetic head 25 is accurately positioned in the housing 23, an imaginary line 51 through the transducing gaps 49 and situated in the head face 27 being perpendicular to a tangent line 53 to the two tape-guide surfaces 41, 43 of the height limiters 33, 35.

Figure 3:
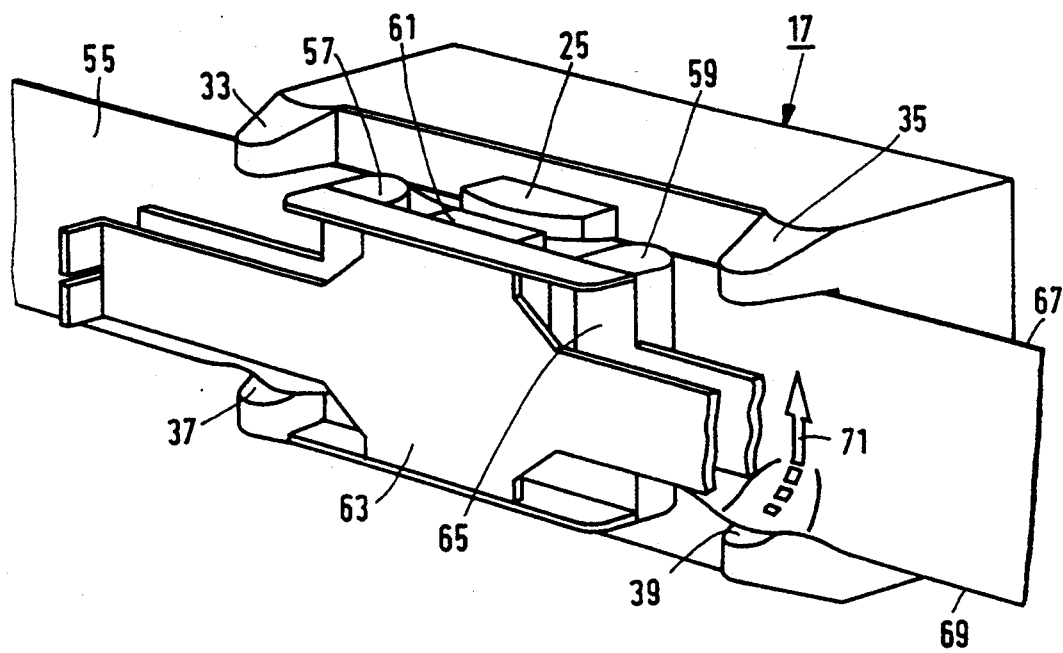
FIG. 3 illustrates the cooperation between the magnetic-head unit shown in FIG. 2 and a magnetic tape.

FIG. 3 illustrates the cooperation between the magnetic-head unit 17 and a magnetic tape 55 of a magnetic-tape cassette in operation. In operation the magnetic-head unit 17 extends partly into the magnetic-tape cassette via an opening in the housing of the cassette, the magnetic head 25 being in contact with the magnetic tape 55. Of the magnetic-tape cassette only the magnetic tape 55, tape guides 57, 59 provided in the magnetic-tape cassette and a tape-pressure felt 61 are shown. In operation the tape-pressure felt 61 presses the magnetic tape 55 against the head face of the magnetic head 25 at the location of the transducing gaps. For this purpose the tape-pressure felt 61 is arranged on a blade spring 63. The tape guides 57, 59 provided in the magnetic-tape cassette guide the magnetic tape 55 at both sides of the magnetic head 25 and thereby enlarge the wrapping angle of the magnetic tape around the magnetic head, which improves the head-to-tape contact. These tape guides 57, 59 are aim disposed on a blade spring 65. An edge 67 of the magnetic tape 55 is guided by the height limiters 33, 35. The other edge 69 of the magnetic tape 55 is guided by the tape-pressure walls 37, 39. Since these tape-pressure walls 37, 39 are inclined relative to the magnetic tape 55, the magnetic tape 55 is subjected to a force in a direction 71 towards the height limiters 33, 35. This construction of the magnetic-head unit ensures that an edge of the magnetic tape is always in contact with the height limiters, so that the magnetic tape always occupies the same position relative to the magnetic head and azimuth errors are consequently avoided.

Figure 4:
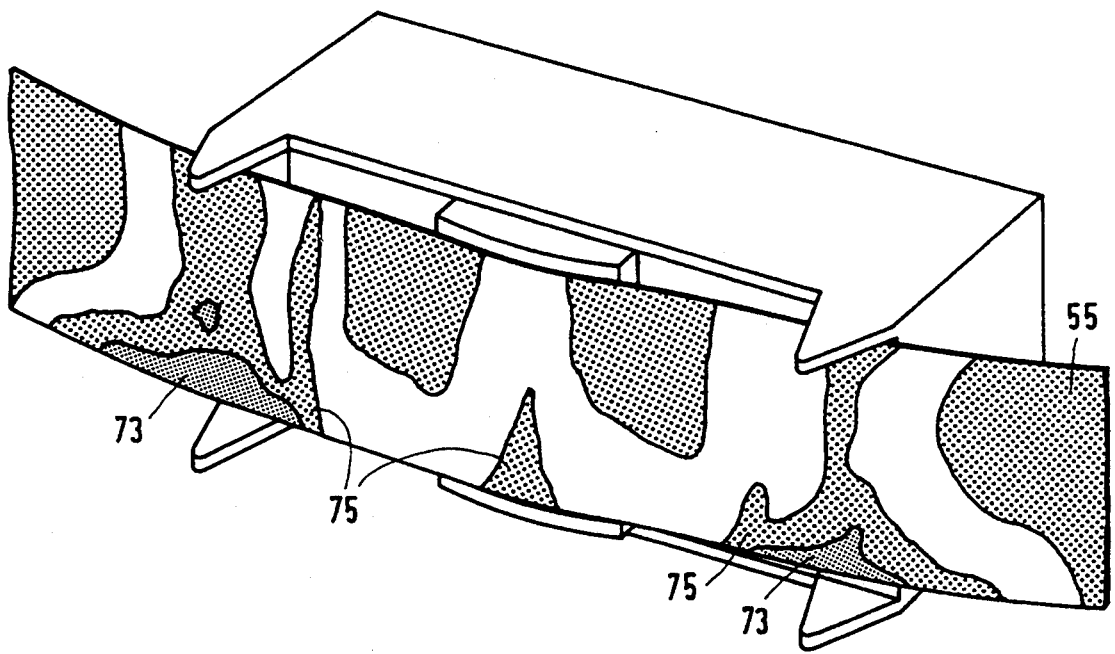
FIG. 4 illustrates the deformation of the magnetic tape during cooperation with a magnetic-head unit in a known magnetic-tape apparatus.

However, if in operation the longitudinal axis of the magnetic tape initially does not extend perpendicularly to the transducing gap the tape-pressure walls will urge the magnetic tape into the correct position. This gives rise to stresses in the magnetic tape, so that the magnetic tape is not pressed against the head face with the same force over its entire width and may even come off the head face near one of its edges. FIG. 4 shows the deformation of the magnetic tape 55 in the known magnetic-tape apparatus in operation. The magnetic tape 55 is deformed in the shaded areas 73 and 75 and may come off the tape guides 29, 31 and the magnetic head 25, which is undesirable.

Figure 5:
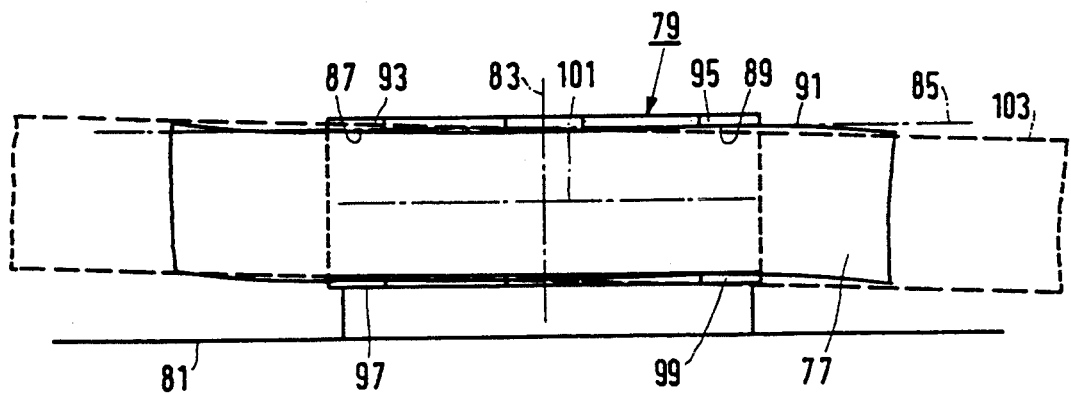
FIG. 5 illustrates the cooperation between a magnetic tape and the magnetic-head unit of the known magnetic-tape apparatus.

FIG. 5 illustrates the cooperation between a magnetic tape 77 and a magnetic-head unit 79 of the known magnetic-tape apparatus. In this apparatus the magnetic-head unit 79 is secured to a mounting surface 81 of the magnetic-tape apparatus, the imaginary line 83 through the transducing gaps of the magnetic head extending perpendicularly to the mounting surface 81 of the magnetic-tape apparatus. Moreover, the imaginary line 83 extends perpendicularly to the tangent line 85 to the two tape-guide surfaces 87, 89. Since the inclined tape-pressure walls 97, 99 press the magnetic tape 77 against the tape-guide surfaces 87, 89 of the height limiters 93, 95 with an edge 91, the longitudinal axis 101 of the magnetic tape 77 extends perpendicularly to the imaginary line 83 through the transducing gaps. If initially the longitudinal axis of the magnetic tape does not extend perpendicularly to the imaginary line, represented as a broken line 103, the magnetic tape is urged into the correct position. As already stated, this gives rise to stresses in the magnetic tape. This may result in the magnetic tape coming off the head face of the magnetic head and, as a consequence, a break occurs in the signal transmission between the magnetic tape and the magnetic head.

Figure 6:
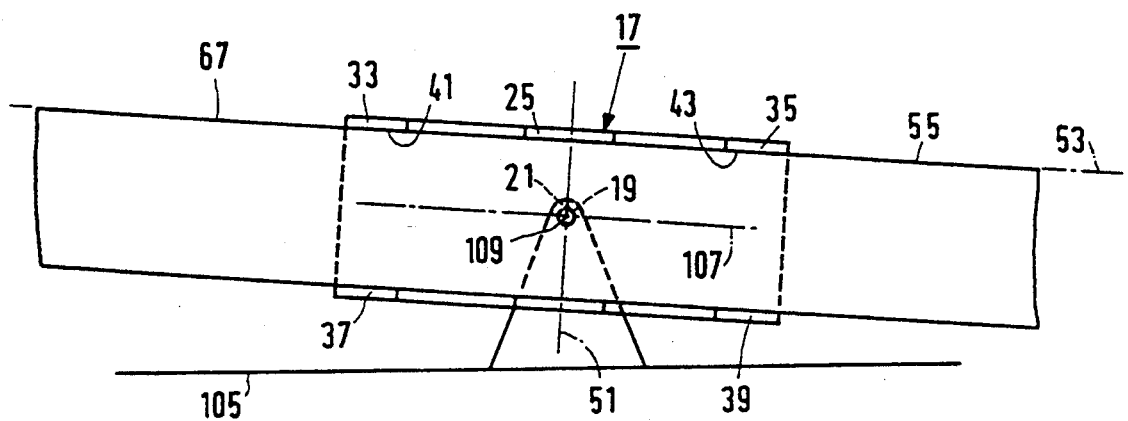
FIG. 6 illustrates the cooperation between a magnetic tape and the magnetic-head unit of the magnetic-tape apparatus in accordance with the invention.

FIG. 6 illustrates the cooperation between a magnetic tape 55 and the magnetic-head unit 17 of the magnetic-tape apparatus in accordance with the invention. The magnetic-head unit 17 is connected to a spindle 19, which is rotatable in a beating 21. If the magnetic tape 55 is inclined relative to the mounting surface 105 of the magnetic-tape apparatus, the magnetic-head unit 17 is pivoted in that an edge 67 of the magnetic tape 55 is pressed against the tape-guide surfaces 41, 43 of the height limiters 33, 35. In other words, the height limiters 33, 35 are pressed against the edge 67 of the magnetic tape 55 in that the tape-guide surfaces 37, 39 push off against the magnetic tape 55, causing the magnetic-head unit 17 to be pivoted in a manner such that the imaginary line 51 through the transducing gaps is oriented perpendicularly to the longitudinal axis 107 of the magnetic tape 55. In order to achieve a smooth pivotal movement the construction is such that the pivotal axis extends through the centre of gravity 109 of the magnetic-head unit 17.

Figure 7:
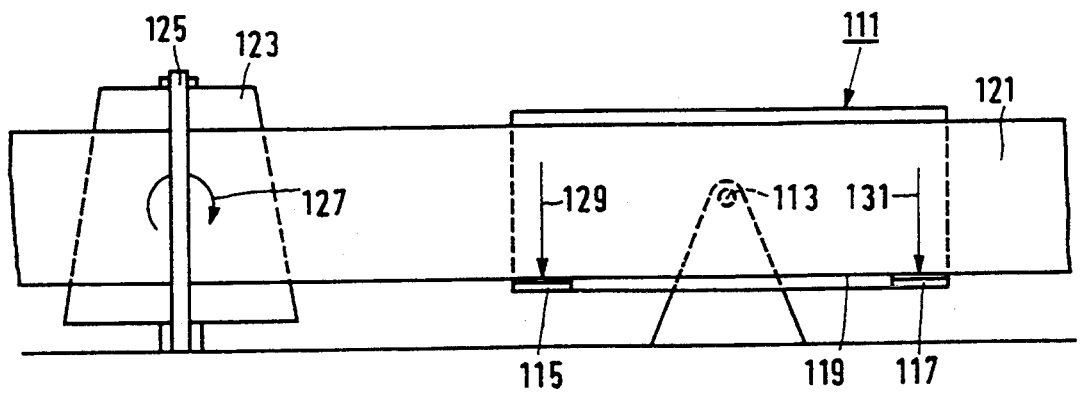
FIG. 7 illustrates the cooperation between a magnetic tape and a second embodiment of the magnetic-tape apparatus in accordance with the invention.

FIG. 7 shows a second embodiment of the magnetic-tape apparatus in accordance with the invention. Also in this embodiment a magnetic-head unit 111 is pivotable about an axis 113 and the magnetic-head unit has height limiters 115, 117 for guiding an edge 119 of a magnetic tape 121. However, the present magnetic-head unit 111 does not comprise any control elements in the form of, for example, tape-pressure walls to press an edge of the magnetic tape against the height limiters. For this purpose the magnetic-tape apparatus has a conical pressure roller 123. The pressure roller 123 presses the magnetic tape 121 against a capstan 125 in order to obtain proper contact between the magnetic tape and the capstan for the purpose of tape transport. Owing to the conical shape of the pressure roller 123 the pressure roller subjects the magnetic tape 121 to a moment 127, which results in forces 129, 131 being exerted on the magnetic tape 12 1 at the location of the magnetic-head unit 111, which causes the magnetic tape to be pressed against the height limiters 115, 117 with an edge 119. The shape of the pressure roller 123 need not be conical for this purpose but should be of a form such that the magnetic tape is subjected to a moment resulting in a force which presses the magnetic tape against the height limiters.

Although the invention has been described with reference to the drawings this does not imply that the invention is limited to the embodiment shown in the drawings. The invention likewise relates to all embodiments which deviate from those shown in the drawings but fall within the inventive scope defined by the Claims. For example, for pressing the magnetic tape against the height limiters it is also possible to provide the magnetic-tape apparatus with other means than the means, such as the tape-pressure walls and the conical pressure roller, shown herein.

We claim:

1. A magnetic-tape apparatus comprising: a magnetic-head unit including a magnetic head having a head face and at least one transducing gap, which extends in the head face, for writing and/or reading information onto/from a magnetic tape, wherein the magnetic-head unit further comprises two height limiters each having a tape-guide surface for guiding an edge of the magnetic tape, a tangent line, which is tangent to both tape-guide surfaces, extends perpendicular to an imaginary line in the head face which is parallel to the transducing gap, and means for pivotably mounting the magnetic-head unit in the magnetic-tape apparatus such that, under the influence of the magnetic tape, the magnetic-head unit is freely pivotable about an axis perpendicular to a tangent plane to the head face near the transducing gap.

2. A magnetic-tape apparatus as claimed in claim 1, wherein the pivotal axis extends through the centre of gravity of the magnetic-head unit.

3. A magnetic-tape apparatus as claimed in claim 2, further comprising a capstan and a pressure roller, the pressure roller having an at least substantially conical shape.

4. A magnetic-head unit suitable for use in the magnetic-tape apparatus as claimed in claim 3, which unit comprises a magnetic head having a head face and a transducing gap adjacent the head face, and two height guides, which each have a tape-guide surface, wherein in that the magnetic-head unit comprises pivoting means with a pivotal axis which extends perpendicularly to a tangent plane to the head face near the transducing gap.

5. A magnetic-head unit as claimed in claim 4, wherein the pivotal axis extends through the mass centre of the magnetic-head unit.

6. A magnetic-head unit suitable for use in the magnetic-tape apparatus as claimed in claim 2, which unit comprises a magnetic head having a head face and a transducing gap adjacent the head face, and two height guides, which each have a tape-guide surface, wherein the magnetic-head unit comprises pivoting means with a pivotal axis which extends perpendicularly to a tangent plane to the head face near the transducing gap.

7. A magnetic-head unit as claimed in claim 6, wherein the pivotal axis extends through the mass centre of the magnetic-head unit.

8. A magnetic-head unit as claimed in claim 1, further comprising a capstan and a pressure roller, the pressure roller having an at least substantially conical shape.

9. A magnetic-head unit suitable for use in the magnetic-tape apparatus as claimed in claim 8, which unit comprises a magnetic head having a head face and a transducing gap adjacent the head face, and two height guides, which each have a tape-guide surface, wherein the magnetic-head unit comprises pivoting means with a pivotal axis which extends perpendicularly to a tangent plane to the head face near the transducing gap.

10. A magnetic-head unit as claimed in claim 9, wherein the pivotal axis extends through the mass centre of the magnetic-head unit.

11. A magnetic-head unit suitable for use in the magnetic-tape apparatus as claimed in claim 1, which unit comprises a magnetic head having a head face and a transducing gap adjacent the head face, and two height guides, which each have a tape-guide surface, wherein the magnetic-head unit comprises pivoting means with a pivotal axis which extends perpendicularly to a tangent plane to the head face near the transducing gap.

12. A magnetic-head unit as claimed in claim 11, wherein the pivotal axis extends through the mass centre of the magnetic-head unit.

13. A magnetic-tape apparatus comprising:
 a magnetic-head unit including a magnetic head having a head face and at least one transducing gap therein for transferring information to and from a magnetic tape,
 means for moving the magnetic tape past the head face so that the longitudinal axis of the magnetic tape extends perpendicular to the transducing gap, wherein the magnetic head unit further comprises;
 two height limiter elements disposed one on each side of the head transducing gap and each having a tape-guide surface for guiding an edge of the magnetic tape, a line tangent to both tape-guide surfaces and which extends perpendicular to an imaginary line in the head face which is parallel to the transducing gap, and means for mounting the magnetic head unit for rotation about an axis perpendicular to a tangent plane to the head face near the transducing gap, wherein the magnetic head unit is freely pivotable under the influence of the magnetic tape so as to promote automatic alignment of the magnetic-head unit with the magnetic tape.

14. The magnetic-tape apparatus as claimed in claim 13 wherein the magnetic-head unit further comprises control means for urging the magnetic tape into contact with said tape-guide surfaces thereby to limit movement of said tape in a direction transverse to the direction of transport of the tape.

15. The magnetic-tape apparatus as claimed in claim 13 wherein the axis extends through the center of gravity of the magnetic-head unit.

16. The magnetic-tape apparatus as claimed in claim 13 further comprising a capstan and an associated pressure roller shaped so as to subject a passing magnetic tape to a moment resulting in a force which urges the magnetic tape against the tape-guide surfaces.

17. The magnetic-tape apparatus as claimed in claim 16 wherein the pressure roller has an approximately conical shape.

18. A magnetic-head unit for use with a tape apparatus having means for transporting a magnetic tape in a given direction of transport along a face of a magnetic head, comprising:

a magnetic head having a head face and a transducing gap adjacent the head face, two height limiter elements disposed one on each side of the transducing gap and arranged such that the height limiter elements are on opposite sides of the gap in the direction of transport of the tape, each height limiter having a tape-guide surface for guiding an edge of a magnetic tape, and means for pivotably mounting the magnetic head unit for rotation about an axis perpendicular to a tangent plane to the head face near the transducing gap so that the magnetic head unit is pivotable to allow self-alignment with the magnetic tape.

19. The magnetic-head unit as claimed in claim 18 wherein said axis extends through the center of mass of the magnetic head unit, and further comprising;

two tape-pressure walls opposite respective ones of said two height limiters and inclined so as to urge a magnetic tape against respective ones of said tape guide surfaces.

* * * * *